(12) United States Patent
Hahn (10) Patent No.: US 8,414,230 B2
(45) Date of Patent: Apr. 9, 2013

(54) DUST EXTRACTOR

(75) Inventor: Norbert Hahn, Hunstetten-Limbach (DE)

(73) Assignee: Black & Decker Inc., Newark, DE (US)

( * ) Notice: Subject to any disclaimer, the term of this patent is extended or adjusted under 35 U.S.C. 154(b) by 198 days.

(21) Appl. No.: 12/966,040

(22) Filed: Dec. 13, 2010

(65) Prior Publication Data

US 2011/0142558 A1 Jun. 16, 2011

(30) Foreign Application Priority Data

Dec. 15, 2009 (GB) .................................. 0921856.1

(51) Int. Cl.
*B23B 47/28* (2006.01)
*B23B 47/34* (2006.01)

(52) U.S. Cl.
USPC ............................ 408/67; 408/76; 408/115 R (58) Field of Classification Search .............. 408/67, 408/76, 115 B, 115 R
See application file for complete search history.

(56) References Cited

U.S. PATENT DOCUMENTS

| 2,183,262 | A | | 12/1939 | Kelley |
| 4,205,728 | A | * | 6/1980 | Gloor et al. ............... 175/209 |
| 2007/0065242 | A1 | | 3/2007 | Skradski |

FOREIGN PATENT DOCUMENTS

| DE | 29609060 | | 8/1996 |
| DE | 202008008561 | * | 9/2008 |
| EP | 1623793 A1 | * | 2/2006 |
| EP | 1894653 A1 | * | 3/2008 |
| GB | 1375456 | | 11/1974 |
| GB | 2262159 A | * | 6/1993 |
| JP | 2002036055 A | * | 2/2002 |

* cited by examiner

*Primary Examiner* — Daniel Howell
*Assistant Examiner* — Michael Vitale
(74) *Attorney, Agent, or Firm* — Kofi Schulterbrandt; Scott B. Markow; Adan ayala (57) ABSTRACT

A suction cup dust extractor for a drill having a housing with a drill collar attached to the housing and having a drill passage formed through the housing. A recess formed by the walls of the housing has a planar opening and a seal is attached to the walls of the recess which surrounds the planar opening and which, in use, locates against a work piece to create an air tight seal between the housing and the work piece. The housing also has an aperture located thereon through which air can pass; at least one first air passage formed within the housing which enables air to pass from the drill passage to the aperture; and at least one second air passage formed within the housing which enables air to pass from the recess to the aperture; characterized in that the seal comprises a base which is attached to the walls of the recess and a flange which is attached to and extends from the base at an oblique angle to the plane of the opening.

20 Claims, 9 Drawing Sheets

DUST EXTRACTOR

CROSS-REFERENCE TO RELATED APPLICATIONS

This application claims priority, under 35 U.S.C. §119(a)-(d), to UK Patent Application No. GB 09 218 56.1 filed Dec. 15, 2009, the contents thereof to be incorporated herein by reference in its entirety.

FIELD OF THE INVENTION

The present invention relates to a dust extractor for use with a drill, hammer drill or hammer, and in particular to a suction cup dust extractor.

BACKGROUND OF THE INVENTION

U.S. Pat. No. 4,205,728 and DE202008008561 both disclose a suction cup dust extractor for a drill. The present invention aims to provide an improvement in the design over those disclosed in U.S. Pat. No. 4,205,728 and DE202008008561.

BRIEF SUMMARY OF THE INVENTION

Accordingly, there is provided a suction cup dust extractor for a drill comprising:
a housing;
a drill collar attached to the housing, having a drill passage formed through it;
a recess formed by the walls of the housing having a planar opening;
a seal attached to the walls of the recess and which surrounds the planar opening and which, in use, locates against a work piece to create an air tight seal between the housing and the work piece;
an aperture located on the housing through which air can pass;
at least one first air passage formed within the housing which enables air to pass from the drill passage to the aperture; and
at least one second air passage formed within the housing which enables air to pass from the recess to the aperture;
characterized in that the seal comprises a base which is attached to the walls of the recess and a flange which is attached to and extends from the base at an oblique angle to the plane of the opening.

DETAILED DESCRIPTION OF THE INVENTION

An example of a suction cup dust extractor will now be described with reference to FIGS. 1 to 7.

Referring to FIGS. 1 to 7, the suction cup dust extractor comprises a housing 10 and a drill collar 12 rigidly connected to it at the top end of the housing 10. The housing 10 comprises a skirt 14 with a bridge 16 formed on top of the skirt 14. The bridge 16 extends from the middle of the skirt 16 to the top end of the skirt 16 where it is attached to the side of the drill collar 12. The skirt 14 has a top wall 50 and side walls 52 which form a large recess 38, on the opposite side of the skirt 14 to that on which the bridge 16 is attached, which has an opening which faces away from the bridge 16.

The drill collar 12 forms a drill passage 18 which enables a cutting tool, such as a drill bit (not shown), to pass through it (direction of Arrow B in FIG. 5) to engage a work piece 20. The drill collar 12 has a longitudinal axis 22. Both the drill passage 18 and the opening of the recess 38 are orientated in the same direction.

Formed in end 26 of the bridge 16 in the middle of the skirt 14 is an aperture 24 which provides an air exit. The aperture 24 has a longitudinal axis 28 which is perpendicular to and intersects with the longitudinal axis 22 of the drill collar 12.

Formed by internal walls 30 of the housing 10 is a first passage 32 which extends from the aperture 24 towards the drill passage 18 of the drill collar 12. Formed within the first passage 32 is a throat 34 where the diameter of the passage 32 is reduced. Two apertures 36 are formed through the wall of the passage 32 at the narrowest point of the throat 34. The apertures 36 provide a passageway from the passage 32 to the recess 38 formed by the skirt 14.

The passage 32 splits into two passages 60 between the throat 34 and the drill passage 18, each connecting with the drill passage 18 through a separate aperture 62.

An inlet air passage 64 is formed in by a frame 66 attached to the base of the drill collar 12 and operates in the same manner as that described in EP1457288. Air can pass through the inlet air passage into the drill collar 12 as shown by Arrow D.

A seal 40 locates in a groove 42 formed around the periphery of the wall of the skirt 20 on the underside of the skirt 14. When the suction cup dust extractor is placed against a work piece 20, the seal 40 locates against the work piece 20, the work piece 20 sealing the opening to the recess 38 to form a chamber.

An air hole 68 is provided in the wall 50 of the skirt 20 to provide a small air passage between the recess and the surrounding atmosphere. During the use of the suction cup dust extractor, the hole 68 ensures that there is a limited but constant air flow in the recess formed under the skirt 20 if the seal provides a perfect air seal with the work piece 20.

The suction cup extractor further comprises a tubular connection collar 2 which connects to a vacuum source (not shown). A rubber seal 4 is fastened inside of the connection collar 2 and which comprises two rubber rings 4 which extend radially inwards from the drill collar 12 with an aperture 8 formed through them. The rings 4 are capable of gripping onto the nozzle (not shown) of a hose (not shown) of the vacuum source. As the rings 4 are resilient, they can stretch radially outwardly, increasing the size of the apertures 8, enabling nozzles of different sizes to be used. The rings 4 would then grip the nozzle due to their resilience and frictionally hold the nozzle.

The connection collar 2 connects to the aperture 24 via a flexible tube 72. One end of the flexible tube 72 is held in a sleeve 74 formed in the connection collar 2, the other in a sleeve 76 formed in the bridge 16. The flexible tube 72 can be stretched to extend its length and move the collar 2 away from the housing 10 or be bent or twisted to allow the connection collar 2 to be moved to a range of positions relative to the aperture 24. The flexible tube 72 is made from rubber.

In use, the suction cup dust extractor is placed against a surface 70 of the work piece 20 so that the seal 40 makes contact with it. A chamber is formed when opening of the recess 38, formed by the walls 50, 52, of the skirt 14 is sealed by the surface 70 of the work piece 20. The suction device is activated and air is sucked through the connection collar 2, through the flexible tube 72, through the aperture 24, through the first passage 32, through the pair of separate passages 60, through the apertures 62 and then from the drill passage 18. As air passes through the throat 34 of the first passage 32, it speeds up, causing a reduced pressure inside of the two apertures 36 due to a venturi effect. This results in the air in the recess 38 to be sucked out through the apertures 36 and into the passage 32. This causes the skirt 14 and hence the dust extractor, to be attached to the surface 70 due to the suction. The hole 68 ensures that there is a constant flow of air from the hole 68, through the recess 38, and then through the two apertures 36. The operator can then drill a hole in the surface by passing the drill bit through the drill collar 12 and drilling into the surface 70. Any debris generated during the drilling process will be sucked up into the drill passage 18 and then into passages 60. The use of two passages provides better debris clearance. The debris is then transported through the passage 32, through the aperture 24, through the flexible tube 72 and then through the connection collar 2. The hole 68 ensures that there is always air passing through the two aperture into the passage 32, thus ensuring no debris passes into the apertures 36 or the recess 38.

An embodiment of the present invention will now be described with reference to FIG. 8. Where the same features are present in the embodiment which are present in the example, the same reference numbers have been used. The design of the embodiment is the same as for the above example except that the design of the seal 40 has been altered.

Figure 1:
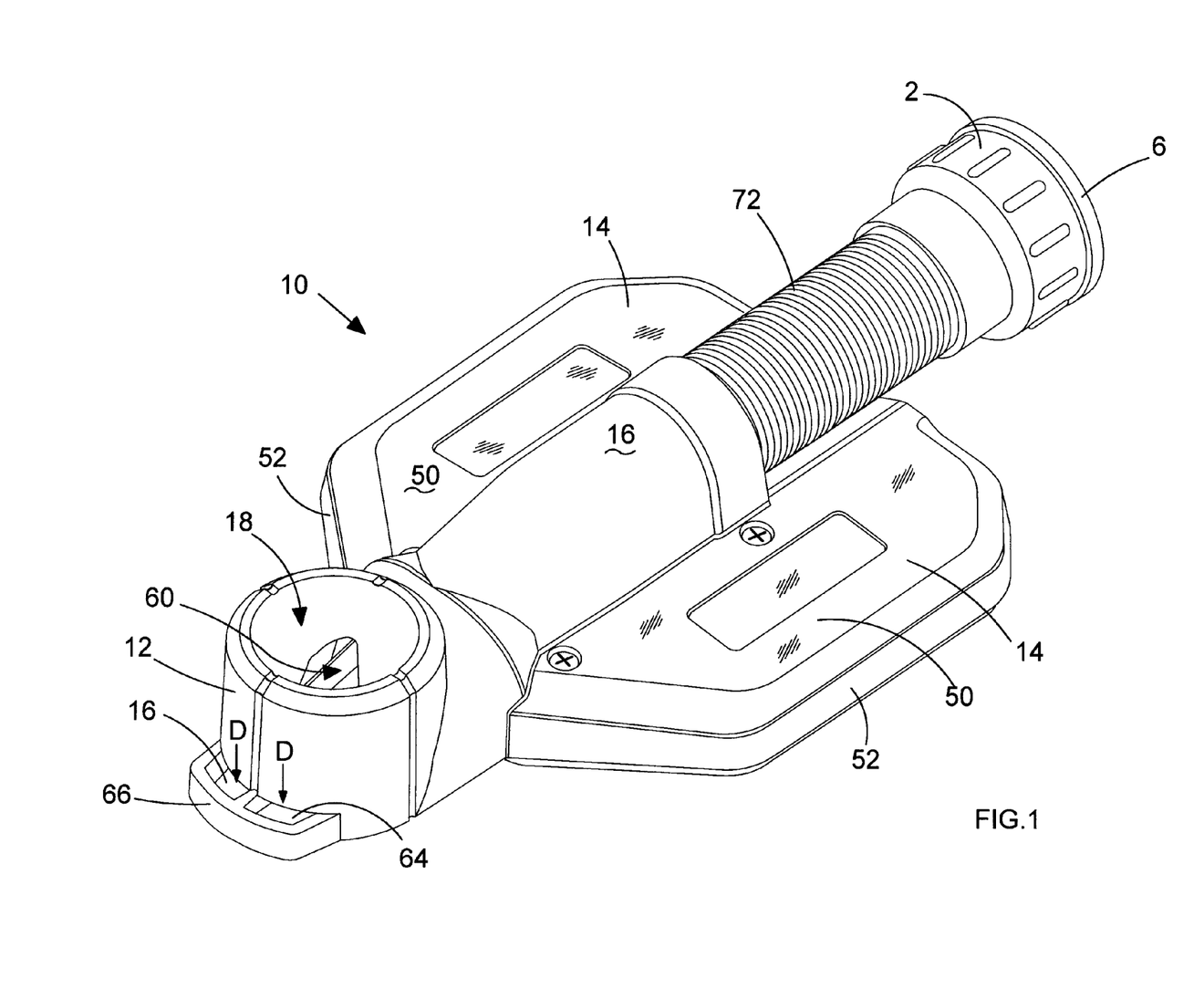
FIG. 1 shows a top perspective view of an embodiment of the suction cup dust extractor of the present invention.
Figure 2:
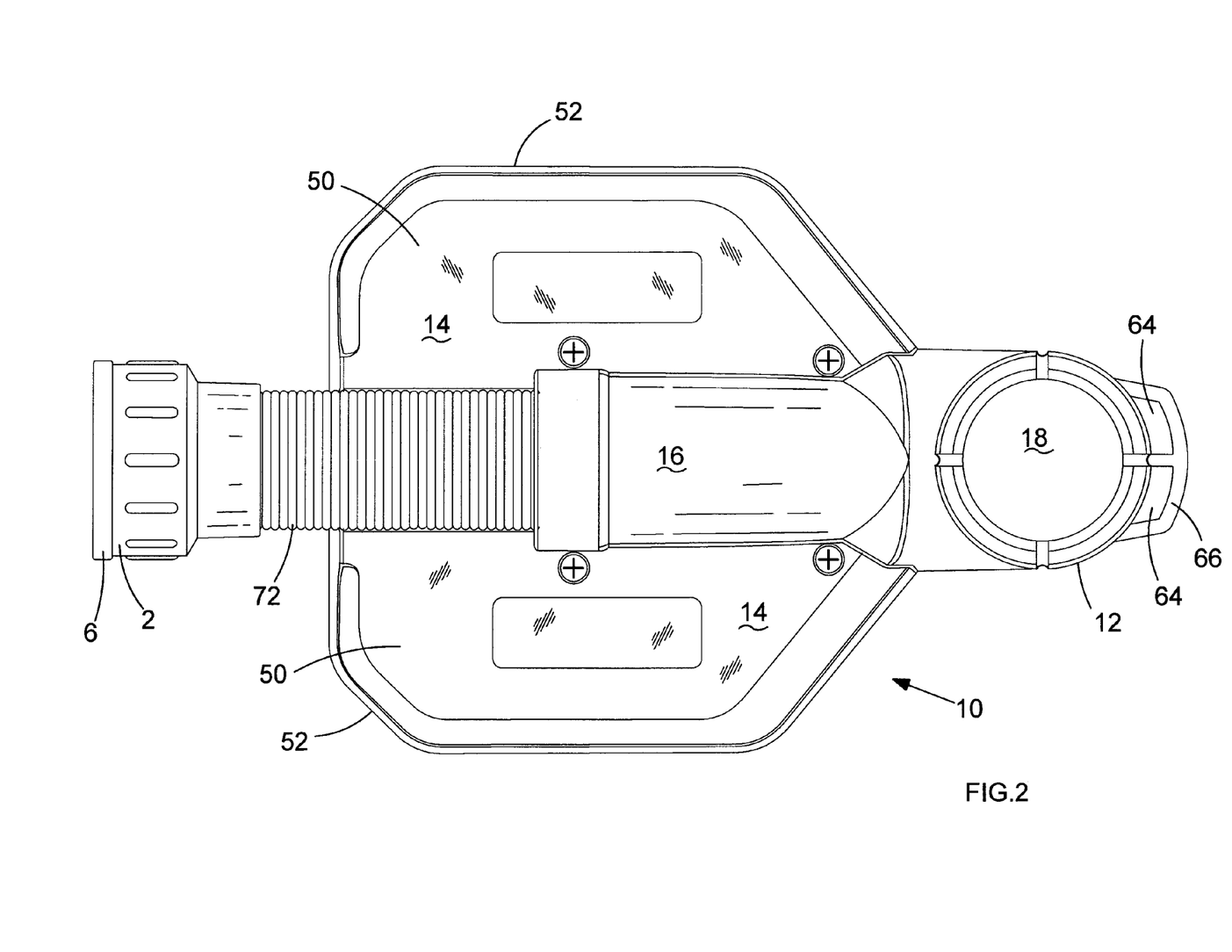
FIG. 2 shows a top view of the suction cup dust extractor of FIG. 1.
Figure 3:
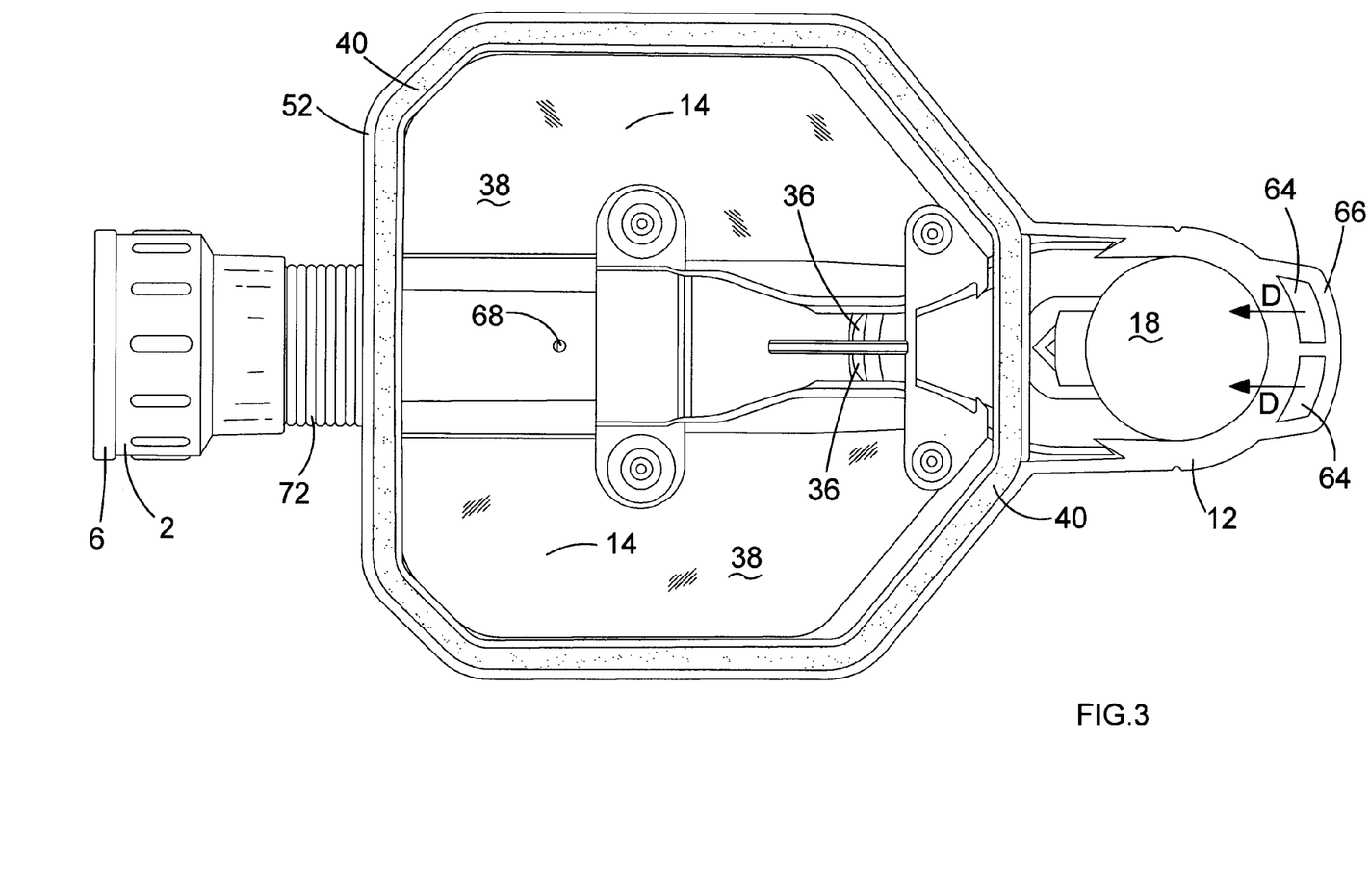
FIG. 3 shows a bottom view of the suction cup dust extractor of FIG. 1.
Figure 4:
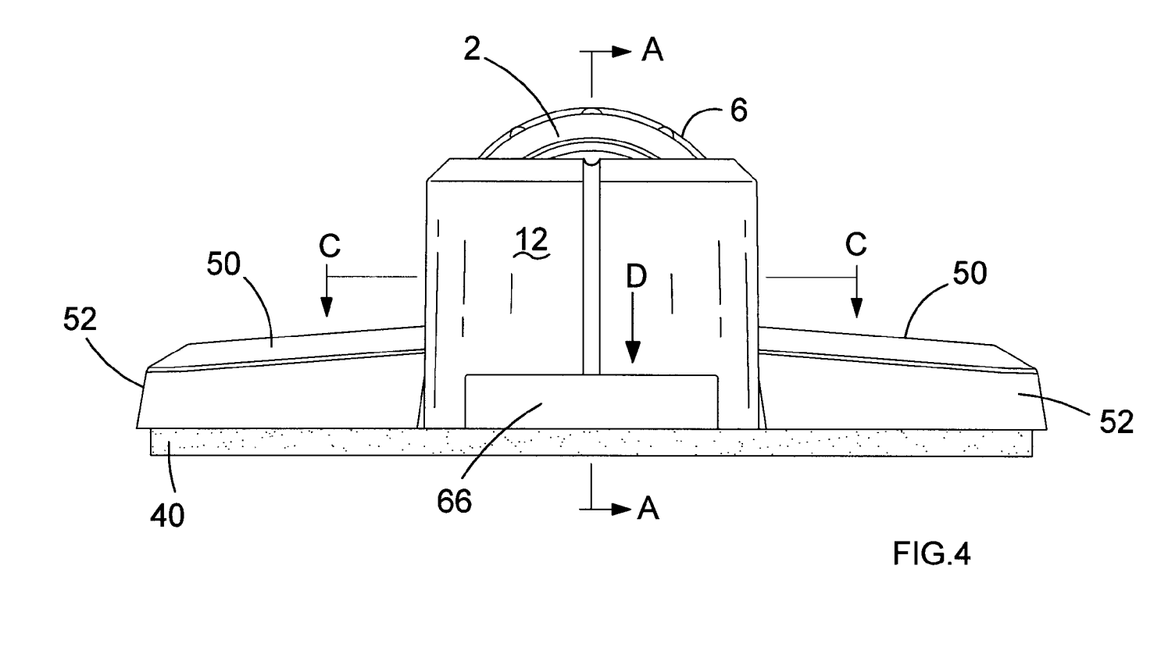
FIG. 4 shows a front view of the suction cup dust extractor of FIG. 1.
Figure 5:
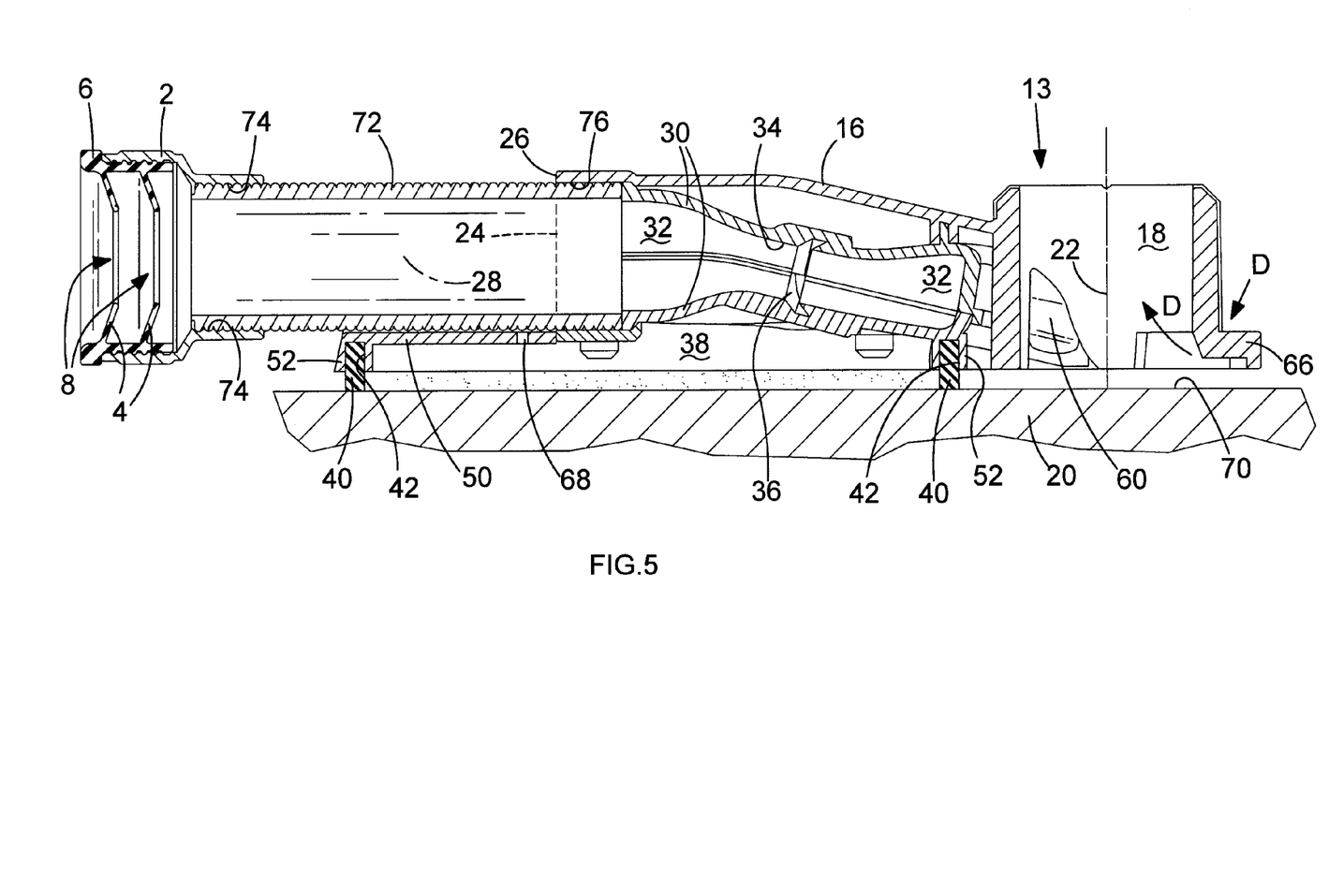
FIG. 5 shows a vertical cross sectional view of the suction cup dust extractor of FIG. 1 in the direction of the Arrows A in FIG. 4.
Figure 6:
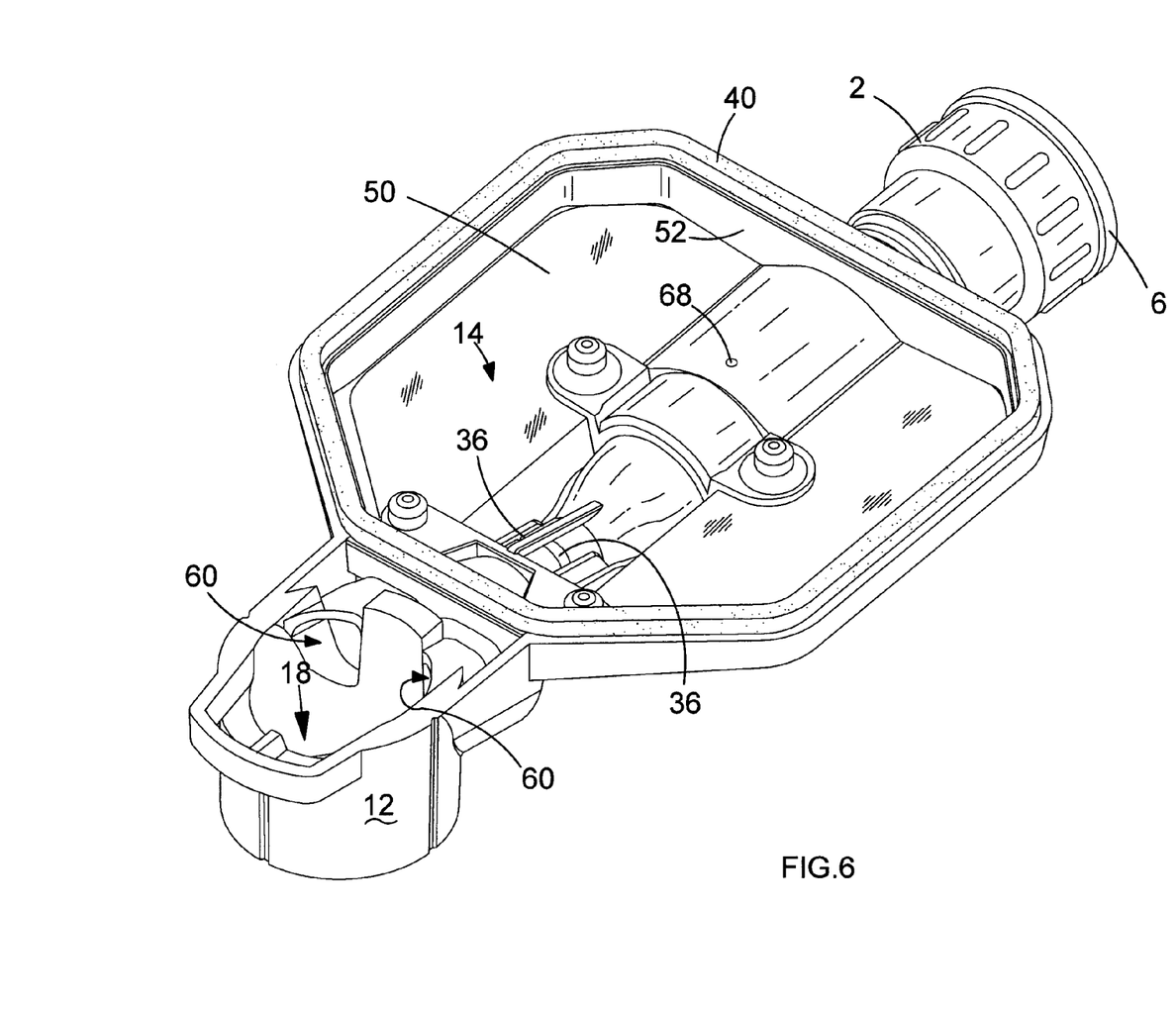
FIG. 6 shows a perspective view of the underside of the suction cup dust extractor of FIG. 1.
Figure 7:
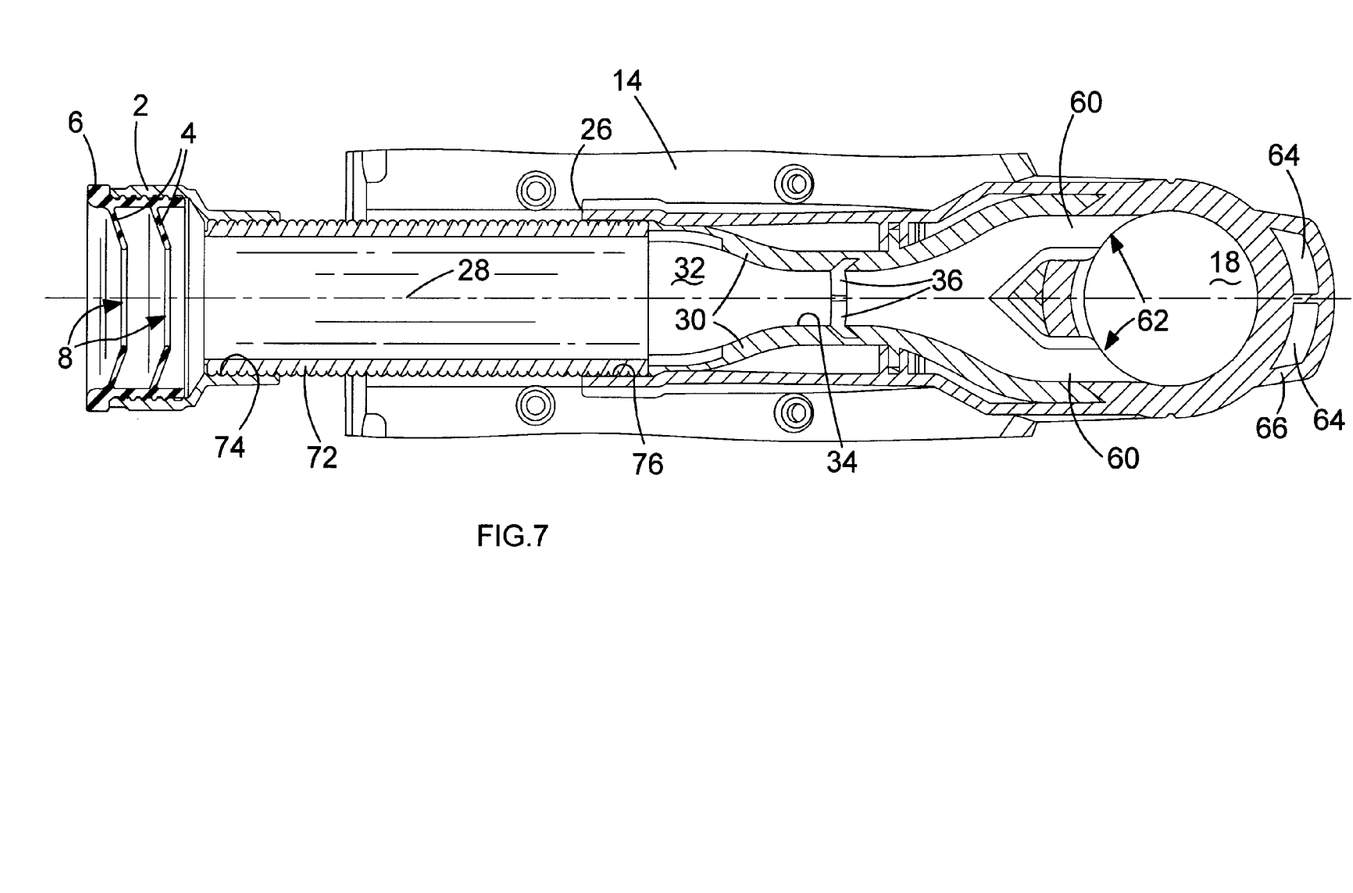
FIG. 7 shows a horizontal cross sectional view of the suction cup dust extractor of FIG. 1 in the direction of arrows C in FIG. 4.
Figure 8:
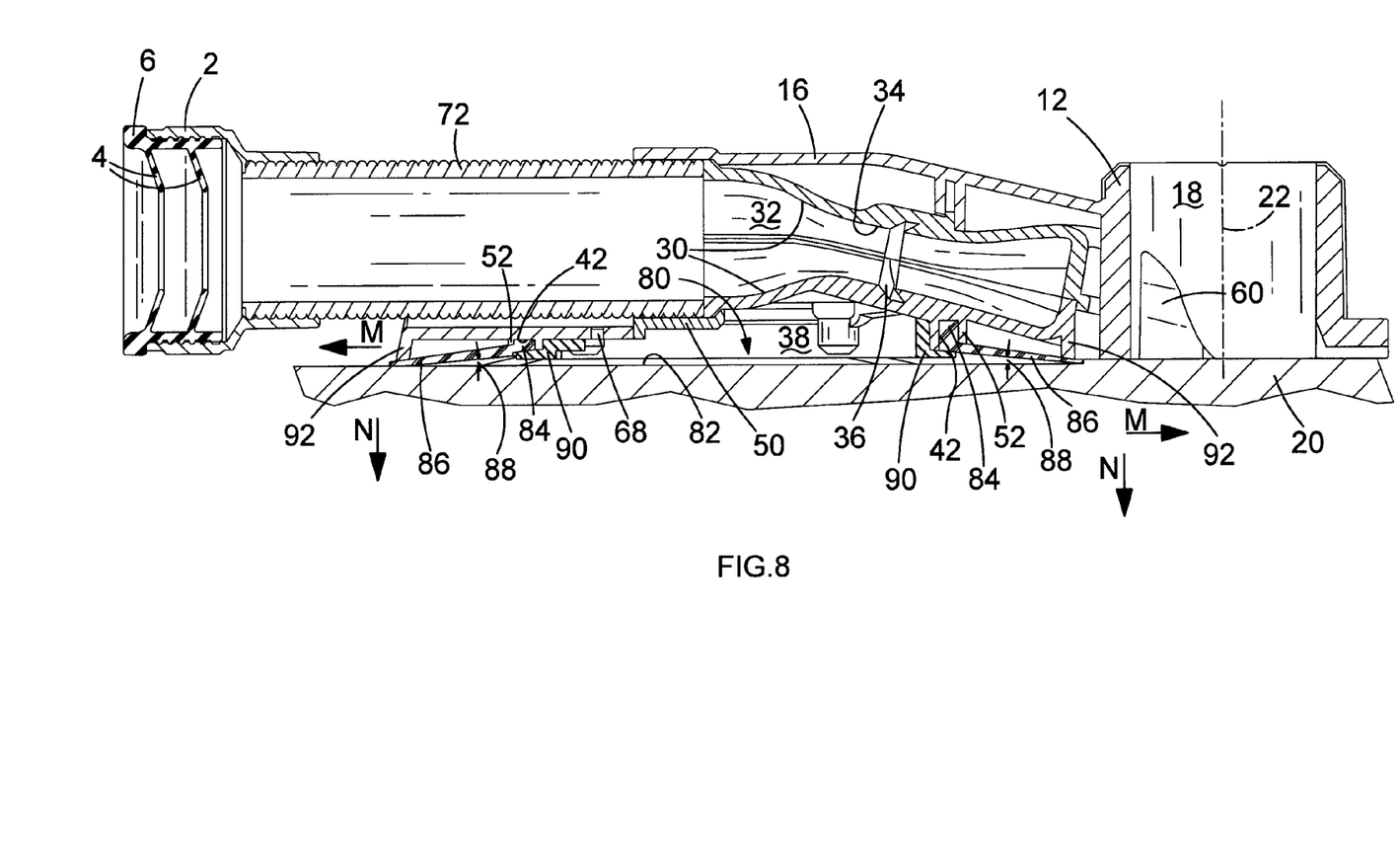
FIG. 8 shows a seal according to another embodiment of the suction cup extractor of the present invention.
Figure 9:
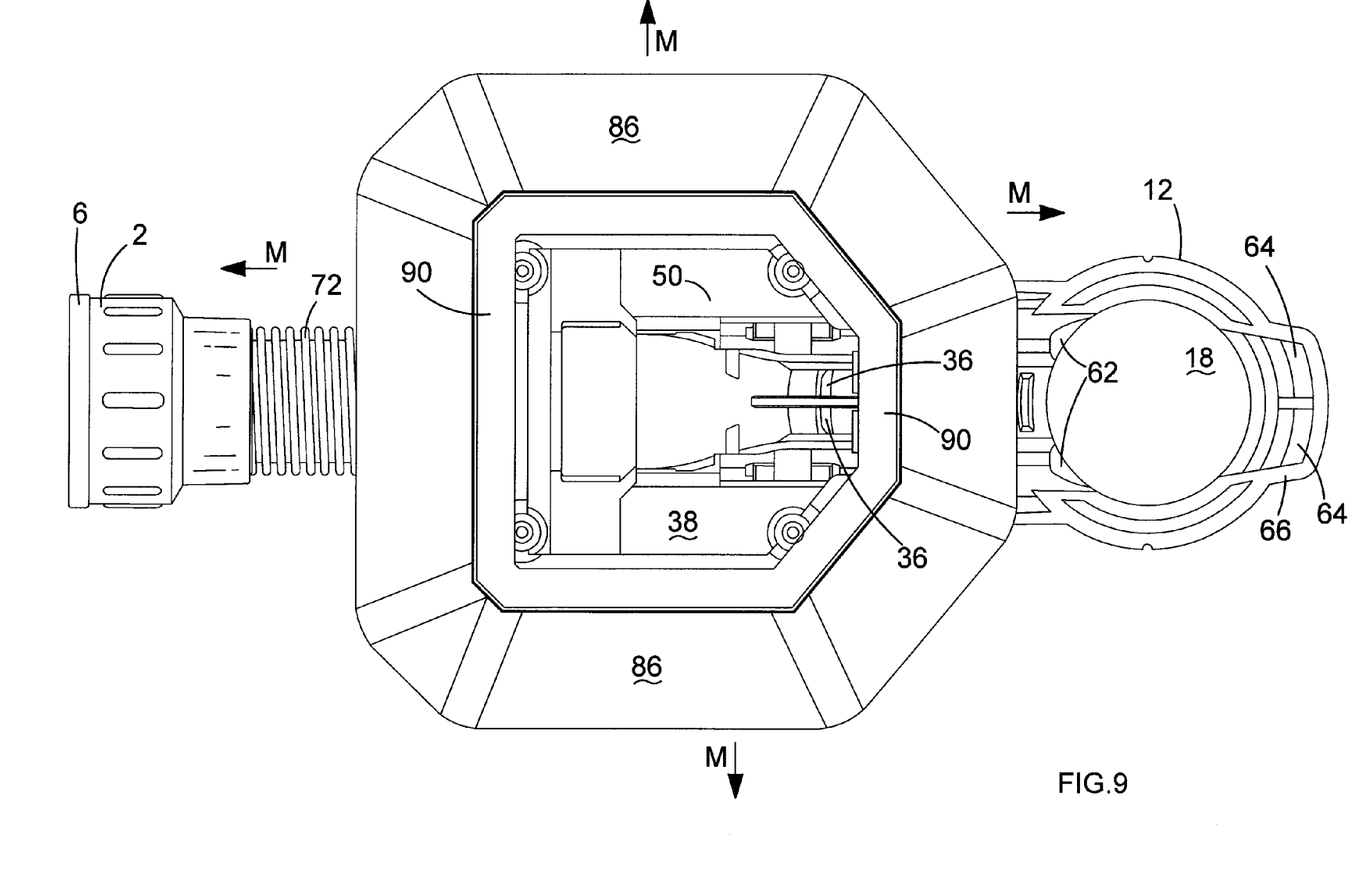
FIG. 9 shows a bottom view of the suction cup dust extractor of FIG. 8.

Referring t FIG. 8, the opening 80 of the recess 38 is planar ie the periphery of the opening 80 locates in a flat plane 82. The seal comprises a base 84 which locates in a groove 42 formed in the wall 52 of the skirt 14. The base 84 of the flange is held within the grove 42 via cover 90 which is held in place on the housing screws (not shown). A flange 86 is attached to the base 84 which extends from the base 84 in a direction which is an oblique or small angle 88 relative to the plane 82. The flange 86 extends, in a direction parallel to the plane 82 (in the direction of Arrows M), away from the opening 80. The flange 86 extends, in a direction perpendicular to the plane 82 (in the directions of Arrows N), away from the opening 80. The outer perimeter of the flange 86 is supported by a secondary wall 92 formed on the shirt 14 of the housing 10.

The invention claimed is:

1. A suction cup dust extractor for a drill comprising:
a housing;
a drill collar attached to the housing, having a drill passage formed through it;
a recess formed by the walls of the housing having a planar opening;
a seal attached to the walls of the recess and which surrounds the planar opening and which, in use, locates against a work piece to create an air tight seal between the housing and the work piece;
an aperture located on the housing through which air can pass;
at least one first air passage formed within the housing which enables air to pass from the drill passage to the aperture; and
at least one second air passage formed within the housing which enables air to pass from the recess to the aperture,
wherein, the seal comprises a base which is attached to the walls of the recess and a flange which is attached to and extends from the base at an oblique angle to the plane of the opening, and
wherein the outer perimeter of the flange is supported by a secondary wall connected to the housing.

2. The suction cup dust extractor of claim 1, wherein the flange extends from the base, in a direction parallel to the plane, away from the opening.

3. The suction cup dust extractor of claim 1, wherein the flange extends from the base, in a direction perpendicular to the plane, away from the opening.

4. The suction cup dust extractor of claim 1, wherein the base locates in a groove formed in the housing.

5. The suction cup dust extractor of claim 1, wherein the seal includes rubber.

6. The suction cup dust extractor of claim 1, further including a connection collar which is connected to the aperture via a flexible tube.

7. The suction cup dust extractor of claim 1, wherein the at least one first passage connects between the aperture and the drill passage.

8. The suction cup dust extractor of claim 1, wherein the at least one second passage intersects with the at least one first passage inside of the housing.

9. The suction cup dust extractor of claim 8, wherein the at least one first passage comprises a throat, the at least one second passage intersecting with the at least one first passage at the throat.

10. The suction cup dust extractor of claim 1, further including a hole in the walls of the recess to allow a limited flow of air into the recess.

11. A suction cup dust extractor for a drill comprising:
a housing;
a drill collar attached to the housing, having a drill passage formed through it;
a recess formed by the walls of the housing having a planar opening;
a seal attached to the walls of the recess and which surrounds the planar opening and which, in use, locates against a work piece to create an air tight seal between the housing and the work piece;
an aperture located on the housing through which air can pass;
at least one first air passage formed within the housing wich enables air to pass from the drill passage to the aperture; and
at least one second air passage formed within the housing which enables air to pass from the recess to the aperture,
wherein, the seal comprises a base which is attached to the walls of the recess and a flange which is attached to and extends from the base at an oblique angle to the plane of the opening, and
wherein the base locates in a groove formed in the housing, and wherein the base is held within the groove via a cover connected to the housing.

12. The suction cup dust extractor of claim 11, wherein the outer perimeter of the flange is supported by a secondary wall connected to housing.

13. The suction cup dust extractor of claim 11, wherein the flange extends from the base, in a direction parallel to the plane, away from the opening.

14. The suction cup dust extractor of claim 11, wherein the flange extends from the base, in a direction perpendicular to the plane, away from the opening.

15. The suction cup dust extractor of claim 11, wherein the seal includes rubber.

16. The suction cup dust extractor of claim 11, further including a connection collar which is connected to the aperture via a flexible tube.

17. The suction cup dust extractor of claim 11, wherein the at least one first passage connects between the aperture and the drill passage.

18. The suction cup dust extractor of claim 11, wherein the at least one second passage intersects with the at least one first passage inside of the housing.

19. The suction cup dust extractor of claim 18, wherein the at least one first passage comprises a throat, the at least one second passage intersecting with the at least one first passage at the throat.

20. The suction cup dust extractor of claim 11, further including a hole in the walls of the recess to allow a limited flow of air into the recess.

* * * * *